(12) United States Patent
Lee et al.

(10) Patent No.: US 12,639,929 B2
(45) Date of Patent: May 26, 2026

(54) METHOD AND APPARATUS FOR EXTRACTING IMAGE FEATURE BASED ON VISION TRANSFORMER

(71) Applicant: ELECTRONICS AND TELECOMMUNICATIONS RESEARCH INSTITUTE, Daejeon (KR)

(72) Inventors: Young Wan Lee, Daejeon (KR); Jong Hee Kim, Daejeon (KR); Jin Young Moon, Daejeon (KR); Kang Min Bae, Daejeon (KR); Yu Seok Bae, Daejeon (KR); Je Seok Ham, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 520 days.

(21) Appl. No.: 18/318,159

(22) Filed: May 16, 2023

(65) Prior Publication Data

US 2023/0368499 A1 Nov. 16, 2023

(30) Foreign Application Priority Data

May 16, 2022 (KR) ........................ 10-2022-0059497

(51) Int. Cl.
*G06K 9/00* (2022.01)
*G06V 10/42* (2022.01)
(Continued)

(52) U.S. Cl.
CPC .......... *G06V 10/7715* (2022.01); *G06V 10/42* (2022.01); *G06V 10/761* (2022.01); *G06V 10/82* (2022.01)

(58) Field of Classification Search
None
See application file for complete search history.

(56) References Cited

U.S. PATENT DOCUMENTS 11,182,651 B2 11/2021 Lee et al.
2021/0201092 A1 7/2021 Szegedy et al.
(Continued)

FOREIGN PATENT DOCUMENTS

KR 1020200038360 A 4/2020
KR 1020210153291 A 12/2021

OTHER PUBLICATIONS

Tsai et al., "Multi-scale patch-based representations learning for image anomaly detection and segmentation", published Jan. 3-8, 2022 (Year: 2022).*
(Continued)

*Primary Examiner* — SJ Park
(74) *Attorney, Agent, or Firm* — Rabin & Berdo, P.C.

(57) ABSTRACT

The disclosure relates to a method of extracting image features based on a vision transformer, a method of performing embedding on an input image in units of patches and extracting visual features through global attention. An apparatus for extracting an image feature based on a vision transformer according to an embodiment of the disclosure includes a memory configured to store data and a processor configured to control the memory, wherein the processor is configured to perform embedding on multi-patches for an input image, extract feature maps for the embedding multi-patches, perform transformer encoding based on a neural network using the extracted feature maps, extract a feature of the input image through a final feature map extracted through the transformer encoding, and wherein the patches have different sizes.

18 Claims, 8 Drawing Sheets

(51) Int. Cl.
   G06V 10/74        (2022.01)
   G06V 10/77        (2022.01)
   G06V 10/82        (2022.01)

(56)                References Cited

U.S. PATENT DOCUMENTS

2021/0365724 A1    11/2021  Lee et al.
2022/0019807 A1     1/2022  Carreira et al.

OTHER PUBLICATIONS

Zhang et al., "MRMR: multi-scale feature and probability map for melanoma recognition", published Jan. 5, 2022 (Year: 2022).*
Gu, J. et al., 'Multi-Scale High-Resolution Vision Transformer for Semantic Segmentation', Computer Science; Computer Vision and Pattern Recognition; arXiv2111.01236v2; Submitted on Nov. 1, 2021 (v1), last revised Nov. 23, 2021 (v2).
Wang, W. et al., 'Pyramid Vision Transformer A Versatile Backbone for Dense Prediction without Convolutions', In Proceedings of the IEEE/CVF international conference on computer vision, pp. 568-578; Oct. 10, 2021.
Notice of Allowance issued for the corresponding KR Patent application No. 10-2022-0059497 and the English translation thereof, dated Feb. 14, 2026.

* cited by examiner

FIG. 4

METHOD AND APPARATUS FOR EXTRACTING IMAGE FEATURE BASED ON VISION TRANSFORMER

CROSS-REFERENCE TO RELATED APPLICATION

This application claims priority to and the benefit of Korean Patent Application No. 10-2022-0059497, filed on May 16, 2022, the disclosure of which is incorporated herein by reference in its entirety.

BACKGROUND

1. Field of the Invention

The present disclosure relates to an apparatus and method for extracting image features based on a multi-scale transformer using artificial intelligence (AI), and relates to an invention that performs embedding on an input image in units of patches and extracts visual features through global attention.

2. Discussion of Related Art

Artificial intelligence (AI) technology has been rapidly developing in recent years. With rapid integration and spread in various fields, such as transportation, media, logistics, safety, and environment, as well as cognition/judgement systems for autonomous driving vehicles, AI technology is gaining attention as a new source of value-added creation that can lead the human-centered value industry and knowledge information society.

In particular, there has been suggested a technology that applies AI to the field of computer vision to extract features included in an image, recognize and classify an object, and extract features of the object in a method similar to a method of a human visually recognizing an image. Image feature extraction technology is a concept including various visual applications, such as object detection in which a single object/instance or a plurality of objects/instances are classified from digital image or video frames or location information (a bounding box) of an object in an image and a category of the object are simultaneously detected, and segmentation in which categories of all pixels in an image are classified. In the image recognition technology, a typical type of network used to extract visual features is a convolution neural network (CNN), and a global attention-based vision transformer network has recently been newly proposed.

SUMMARY OF THE INVENTION

The present disclosure is directed to providing a multi-scale based image feature extraction technology using a rapid and efficient vision transformer.

The present disclosure is directed to providing a technology of extracting image features based on a vision transformer that supports various patch sizes.

The present disclosure is directed to providing a technology of extracting features of various sizes in an image by independently performing transformer encoding using feature maps for patches of different sizes.

Other objectives and advantages of the present disclosure may be clearly understood by those of ordinary skill in the art based on the following descriptions, and become more apparent by describing embodiments thereof. Further, it will be readily apparent that the objects and advantages of the present disclosure may be realized by the means and combinations thereof indicated in the claims.

According to an aspect of the present invention, there is provided an apparatus for extracting an image feature based on a vision transformer, the apparatus including: a memory configured to store data; and a processor configured to control the memory, wherein the processor is configured to perform embedding on multi-patches for an input image, extract feature maps for the embedding multi-patches, perform transformer encoding based on a neural network using the extracted feature maps, extract a feature of the input image through a final feature map extracted through the transformer encoding, and wherein the patches have different sizes.

The embedding may be performed on the patches in the different sizes in a parallel manner.

The transformer encoding may be performed on the feature maps in a parallel manner.

The embedding may be performed on the patches to have areas overlapping each other.

The transformer encoding may be performed by obtaining a correlation between the multi-patches.

The correlation may be determined according to whether a similar region or a similar category is included between the multi-patches.

The correlation may be used to obtain an attention map of the feature maps to extract the final feature map.

The correlation may be calculated through performing embedding for a Key, a Query, and a Value.

The feature map may be extracted by multiplying the Value by the attention map.

The final feature map may be extracted based on a layer that has learned an interaction between the feature maps through performing concatenation and convolution operations on the feature maps.

According to an aspect of the present invention, there is provided a method of extracting an image feature based on a vision transformer, the method including: performing embedding on multi-patches for an input image; extracting feature maps for the embedding multi-patches; performing transformer encoding based on a neural network using the extracted feature maps; and extracting a feature of the input image through a final feature map extracted through the transformer encoding, wherein the patches have different sizes.

The embedding may be performed on the patches in the different sizes in a parallel manner.

The transformer encoding may be performed on the feature maps in a parallel manner.

The embedding may be performed on the patches to have areas overlapping each other.

The transformer encoding may be performed by obtaining a correlation between the multi-patches.

The correlation may be determined according to whether a similar region or a similar category is included between the multi-patches.

The correlation may be used to obtain an attention map of the feature maps to extract the final feature map.

The correlation may be calculated through performing embedding for a Key, a Query, and a Value.

The feature map may be extracted by multiplying the Value by the attention map.

According to an aspect of the present invention, there is provided a program stored in a computer readable medium according to the present disclosure includes, by a computer, embedding multi-patches of an input image; extracting feature maps for the embedding multi-patches; performing neural network-based transformer encoding using the extracted feature maps, and extracting features of the input image through a final feature map extracted through the transformer encoding, wherein the patches have different sizes from each other.

According to an aspect of the present invention, there is provided a transformer encoding method for extracting an image feature based on a vision transformer, the transformer encoding method including: performing normalization based on feature maps obtained by performing embedding on multi-patches; calculating a correlation between the multi-patches to perform a self-attention operation; and generating a final feature map based on the correlation using an attention map generated by the self-attention operation, wherein the patches have different sizes, and the correlation is derived through performing embedding for a Key, a Query, and a Value.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 4 is a diagram illustrating a multi-path transformer encoder according to an embodiment of the present disclosure;

DETAILED DESCRIPTION OF EXEMPLARY EMBODIMENTS

Figure 1:
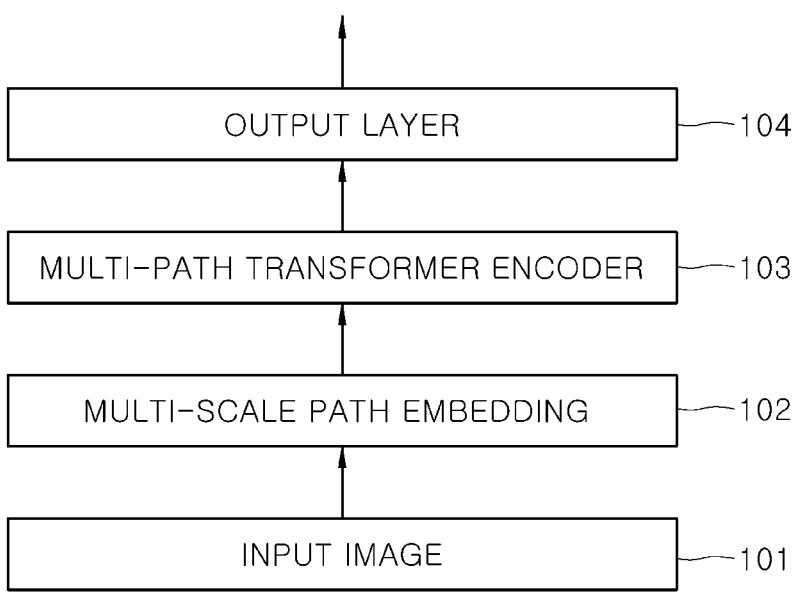
FIG. 1 is a block diagram illustrating a vision transformer based on multi-patch embedding according to an embodiment of the present disclosure.

Hereinafter, embodiments of the present invention will be described in detail with reference to the accompanying drawings to enable those skilled in the art to easily practice the present disclosure. However, the present disclosure may be embodied in various ways, and is not to be construed as limited to the embodiments set forth herein.

In the description of the embodiments, the detailed description of related known functions or constructions will be omitted to avoid making the subject matter of the present invention unclear. In the drawings, parts irrelevant to the description have been omitted, and the same reference numerals are used to designate the same elements throughout the specification.

In the present disclosure, components that are distinguished from each other are intended to clearly describe each feature and do not necessarily mean that the components are separated. That is, a plurality of components may be integrated into one hardware or software unit, or a single component may be distributed into a plurality of hardware or software units. Thus, unless otherwise noted, such integrated or distributed embodiments are also included within the scope of this disclosure.

In the present disclosure, the components described in the various embodiments are not necessarily essential components, and some may be optional components. Thus, embodiments composed of a subset of the components described in one embodiment are also included within the scope of the present disclosure. Also, embodiments that include other components in addition to the components described in the various embodiments are also included in the scope of the present disclosure.

In describing embodiments of the present disclosure, artificial intelligence (AI) may include AI neural networks, models, networks, and the like.

In describing embodiments of the present disclosure, multi-patches (embedding) may include a plurality of patches (embeddings) and/or patches (embedding) of various sizes (scales).

In describing embodiments of the present disclosure, multi-scale embedding may be used interchangeably with multi-patches (embedding).

Hereinafter, embodiments of the present disclosure will be described in detail with reference to the drawings.

FIG. 1 is a block diagram illustrating a multi-patch embedding-based vision transformer according to an embodiment of the present disclosure. More specifically, in FIG. 1, a vision transformer usable for vision transformer-based image extraction is illustrated.

As an embodiment, a vision transformer network based on multi-scale embedding may be provided to receive an input image 101, and include a multi-scale patch embedding unit 102, a multi-path transformer encoder 103, and an output layer 104.

First, the input image 101 may include a video (frames), images, moving images, and the like, and the multi-scale patch embedding unit 102 may perform multi-patch embedding on the input image 101. The multi-scale patch embedding unit 102 may divide the input image 101 into one or more figures (e.g., quadrangles) and divide the image into patches each including one or more figures. Accordingly, an image may include one or more patches, and the sizes of the patches may be the same or different. That is, the size of the patch may not be limited to a certain size. In addition, the multi-scale patch embedding unit 102 may extract a feature map for each of the patches. Patch embedding will be described in more detail with reference to FIGS. 2 and 3.

Thereafter, the multi-path transformer encoder 103 may receive the previously generated feature maps as inputs, and independently perform transformer encoding, and then merge the resulting multi-path feature maps generated by the transformer encoding. By merging the generated multi-feature maps and performing certain processing on the multi-feature maps, a final feature map may be generated. Here, transformer encoding may include encoding based on an AI-based vision transformer network. The multi-path transformer encoder 103 may generate the final feature map by learning correlations and interactions between the patches. Transformer encoding will be described in more detail with reference to FIGS. 4 and 5.

Thereafter, the output layer 104 may receive the generated final feature map as an input and perform vision transformer-based image feature extraction using the generated final feature map. The image feature extraction may include object recognition in an image, and the object recognition in an image may include a process of extracting object information including a size, a characteristic, a movement method, and a shape of an object.

Figure 2:
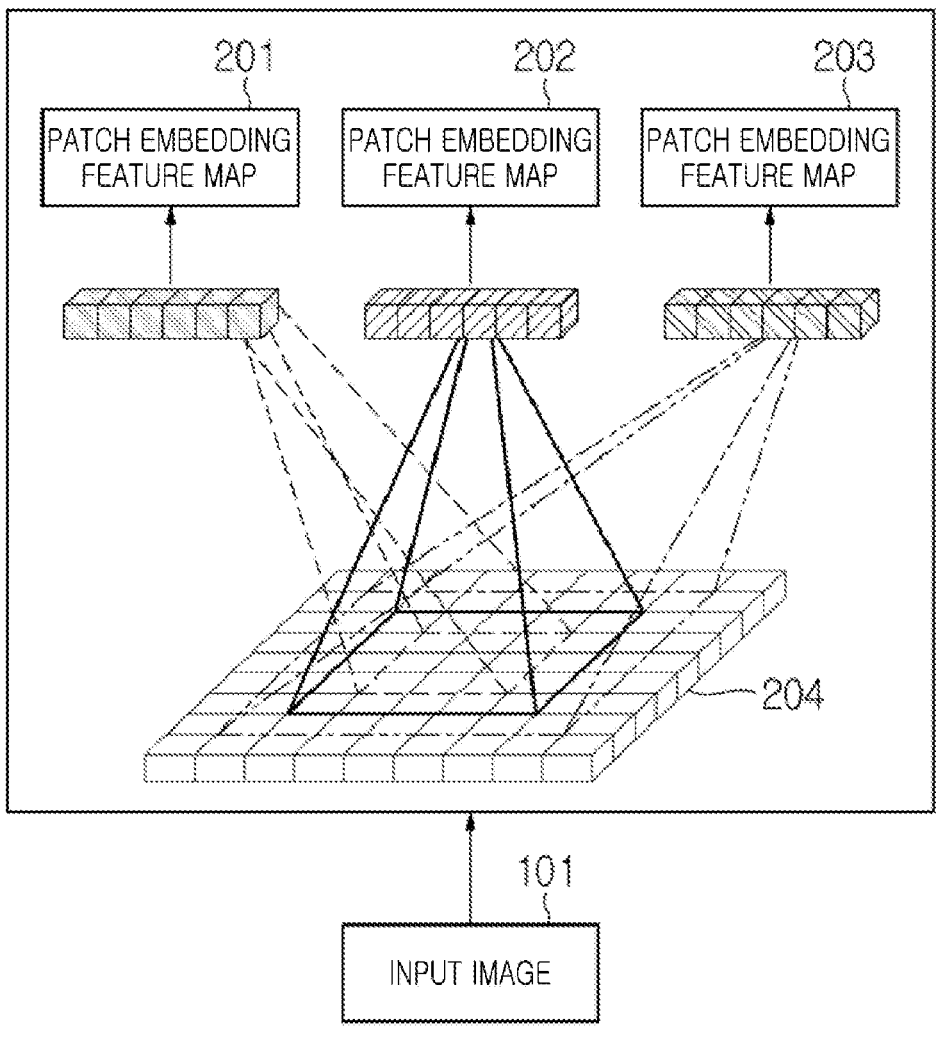
FIG. 2 is a diagram illustrating a multi-patch embedding process according to an embodiment of the present disclosure.
Figure 3:
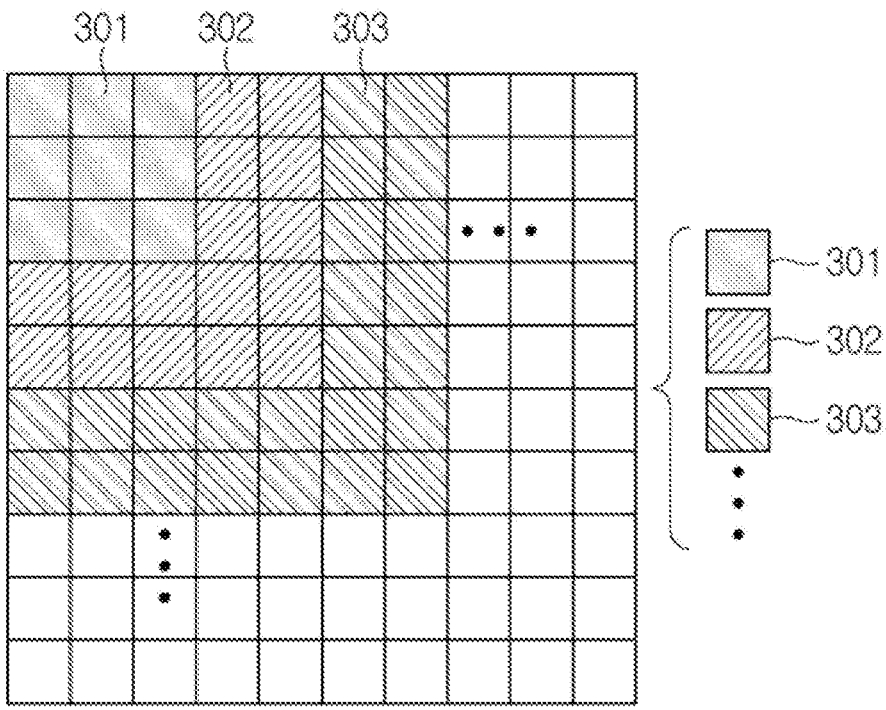
FIG. 3 is a diagram illustrating a patch overlap in a multi-patch embedding process according to an embodiment of the present disclosure.

FIG. 2 is a diagram illustrating a multi-patch embedding process according to an embodiment of the present disclosure, and FIG. 3 is a diagram illustrating a patch overlap in a multi-patch embedding process according to an embodiment of the present disclosure. As an example, FIG. 3 may concern the multi-patch embedding process shown in FIG. 2, and the following description will be based on the example, but this is for clarity of description, and the present disclosure is not limited thereto.

As an embodiment, the multi-patch embedding process shown in FIG. 2 may be performed by the multi-scale patch embedding unit 102 shown in FIG. 1, and the following description will be based on the example, but this is for clarity of description, and the present disclosure is not limited thereto.

As an embodiment, in the multi-patch embedding process, an input image 101 is received, and patch embedding may be performed on the input image 101 in different patch sizes. As an example, the patches may be formed to overlap each other. Even in the example of FIG. 2, a third patch embedding feature map 203 is implemented to be extracted from a patch that partially overlaps a patch of a second patch embedding feature map 202, and the second patch embedding feature map 202 is implemented to be extracted from a patch that partially overlaps a patch of a first patch embedding feature map 201. The form of the input image can be seen in FIG. 3. As an example, a first patch 301 may be provided in a 3×3 form and correspond to the first patch embedding feature map 201, and a second patch 302 may be provided in in a 5×5 form and correspond to the second patch embedding feature map 202. In addition, a third patch 303 may be provided in a 7×7 form and correspond to the third patch embedding feature map 203, and the third patch 303 may include an area of the second patch 302, and the second patch 302 may include the first patch 301. Areas of the patches do not need to overlap, but it is possible to implement a more accurate feature map by overlapping patches.

As an example, patch embedding may be performed in a parallel manner. Accordingly, embedding is simultaneously performed on patches of different scales, and thus visual information of various sizes may be simultaneously extracted from the feature maps 201, 202, and 203 at the same level. Each of the feature maps 201, 202, and 203 may be related to a patch of a different size. Feature maps obtained by performing embedding on the patches of different sizes in a parallel manner may be provided as parallel inputs to the multi-path transformer encoder (103 in FIG. 1).

Figure 4:
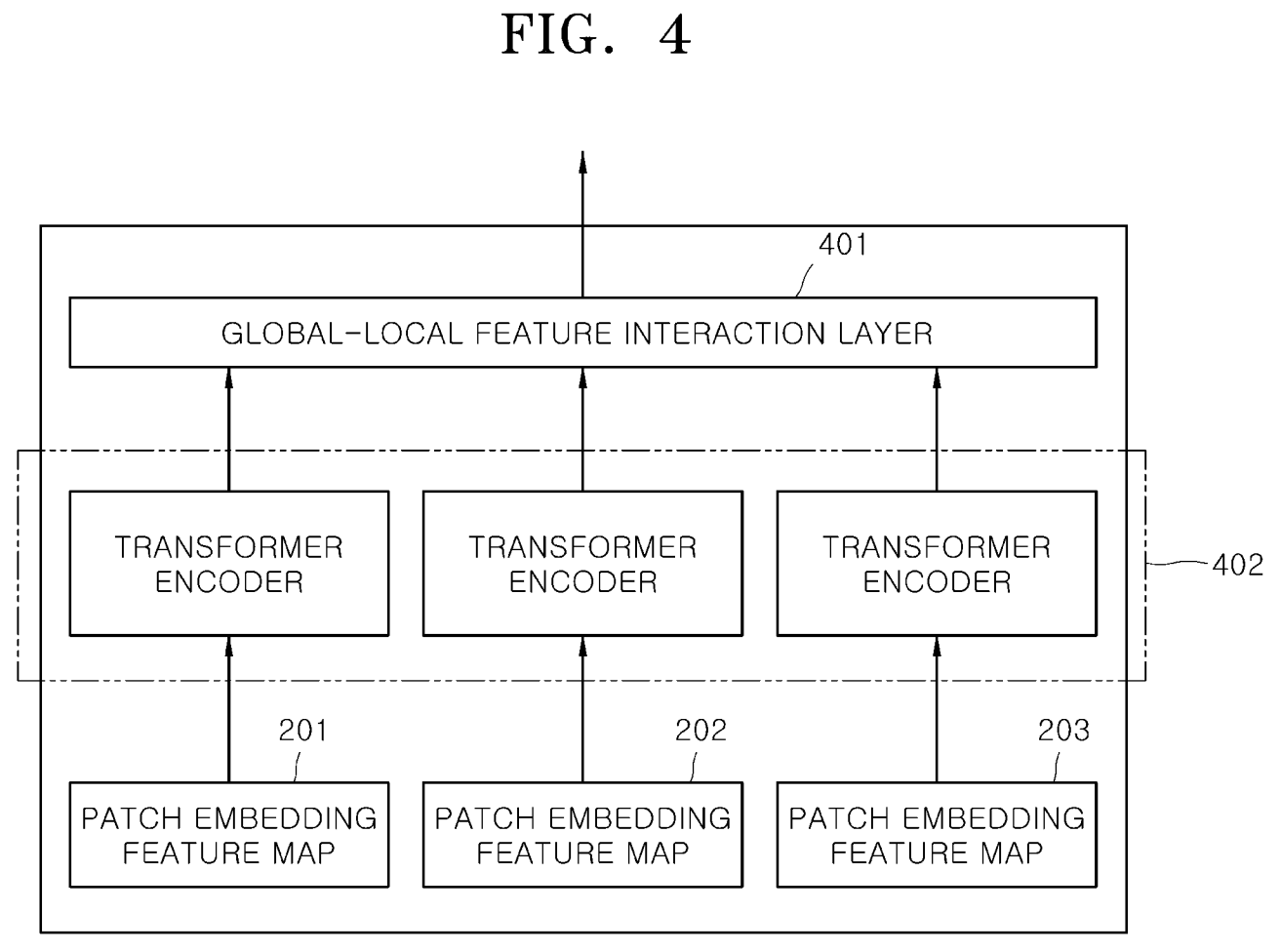
Figure 5:
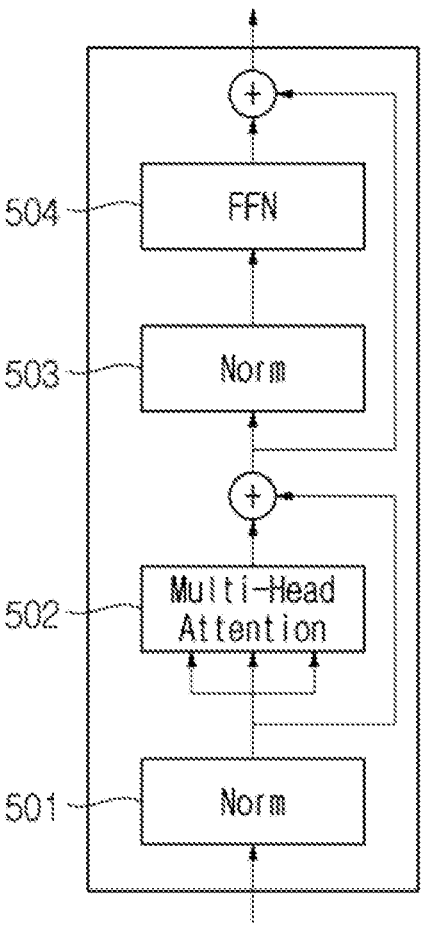
FIG. 5 is a diagram illustrating a transformer encoder according to an embodiment of the present disclosure.

FIG. 4 is a diagram illustrating a multi-path transformer encoder according to an embodiment of the present disclosure, and FIG. 5 is a diagram illustrating a transformer encoder according to an embodiment of the present disclosure. As an example, transformer encoders 402 shown in FIG. 4 may each be configured as shown in FIG. 5.

The multi-path transformer encoder 402 may be present between the patch embedding feature maps 201, 202, and 203 and a global-region feature interaction layer 401, and may be provided as many as the number of patch embedding feature maps, and each of the transformer encoders may be configured independently in parallel. As an example, when three patch embedding feature maps are provided, three transformer encoders may be present, but the patch embedding feature maps do not need to correspond to the transformer encoders in one-to-one correspondence.

The multi-path transformer encoder 402 may receive, as inputs, feature maps generated through multi-scale patch embedding. As an example, the multi-scale patch embedding and the resulting feature maps shown in FIG. 4 may include the multi-patches and the feature maps described with reference to FIGS. 2 and 3.

By using the transformer encoders 402, transformer encoding may be independently performed on each of the generated feature maps to perform a self-attention operation, thereby extracting visual feature information.

Specifically, a feature map obtained by performing embedding on a patch token may be received as an input and passed through a normalization layer 501.

Then, a self-attention operation may be performed through a multi-head attention block 502. The self-attention operation includes a process of obtaining a correlation between input patches, and the correlation may be derived based on a process of performing embedding for a Key, a Query, and a Value.

For example, in deriving the correlation, patches including areas and/or categories having a high degree of similarity are calculated to have a high correlation value, and conversely, unrelated patches are calculated to have a low correlation value. The degree of similarity may be calculated based on a feature included in a patch, an object, or a background, and an attention map QK may be obtained based on a correlation value.

The obtained attention map may be multiplied with a Value value, thereby extracting a feature map in which attention is reflected, and the feature map may be allowed to pass through a normalization layer 503, and finally pass through a feed forward network (FFN) 504, to obtain a final feature map. In the normalization layers 501 and 503, well-known normalization technologies can be performed, and normalization technology is not specified to one example.

Meanwhile, since the self-attention is performed through with feature maps obtained by performing embedding on different-sized patches through the transformer encoder, visual feature information for patches of various sizes may be simultaneously extracted in parallel.

Each of the extracted feature maps may be used as an input for the global-region feature interaction layer 401 shown in FIG. 4, and the global-region feature interaction layer 401 may learn an interaction process using the various pieces of visual feature information that are extracted on the basis of the attention-based feature maps on the different sized patches. For multi-patch-based image feature extraction (e.g., image object recognition), a global-region feature interaction layer that has completed learning at least once may be used.

Specifically, the global-region feature interaction layer 401, the transformer encoder 402, and the multi-scale patch embedding unit 102 shown FIG. 1 may be used for AI-based learning. When the global-region feature interaction layer 401 learns the interaction process, the learning is performed using different patch embeddings as inputs, in which the feature maps output through the transformer encoder are subjected to a concatenation operation along a channel axis, and then a convolution operation (e.g., 1×1). As a result, the interaction between feature maps of different scales may be learned. The feature maps passed through the global-region feature interaction layer are again input to the multi-scale patch embedding layer, and then input to the multi-path transformer encoder 103 again, in a recursive manner to continue the learning.

Figure 6:
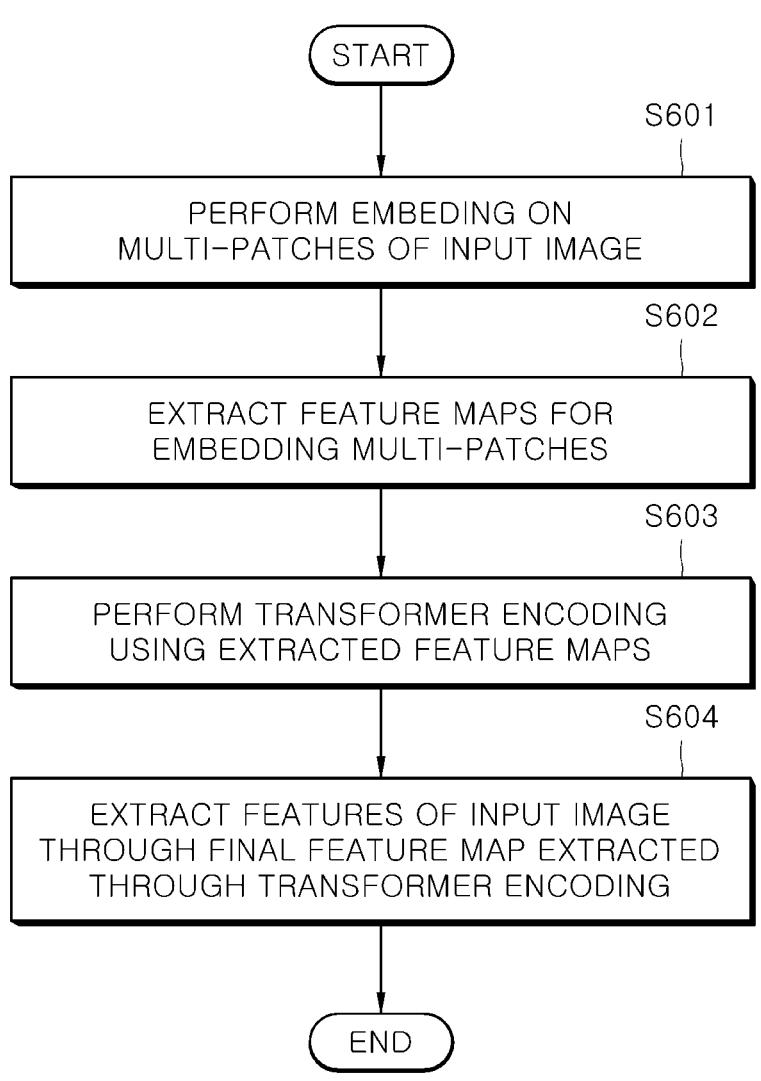
FIG. 6 is a flowchart showing a method of extracting an image feature based on a vision transformer according to an embodiment of the present disclosure.

FIG. 6 is a flowchart showing a method of extracting an image feature based on a vision transformer according to an embodiment of the present disclosure. As an example, the method of extracting an image feature shown in FIG. 6 may be used for multi-patch based image object recognition.

As an example, the method of extracting an image feature based on a vision transformer may be performed using the technology described with reference to FIGS. 1 to 5, and may be performed by an apparatus and system for extracting an image feature based on a vision transformer described with reference to FIG. 8.

As an example, for vision transformer-based image feature extraction, multi-patch embedding may be performed on an input image (S601). Multi-patches may be one or more patches and/or patches of various sizes, and embedding may be performed on the patches in parallel. That is, embedding may be performed on a plurality of patches and/or various sized patches at the same time, and may be performed on patches overlapping each other. That is, embedding may be performed on one patch including another patch. Embedding patches may be used to generate patch embedding feature maps.

Thereafter, feature maps for the embedding multi-patches may be extracted (S602). The process of extracting feature maps may also be performed on each patch in parallel, and each of the feature maps may be used to use a final feature map, or may be merged into one.

Using the extracted feature maps for the multi-patches, neural network-based transformer encoding may be performed (S603). Here, the transformer encoding may be performed on each of the feature maps in a parallel manner, or may be performed by obtaining a correlation between a plurality of patches or between feature maps for the patches. As an example, the correlation may be determined according to whether a similar region or a similar category is included between a plurality of patches, and the similarity evaluation may be calculated based on features included in patches or features of objects. In addition, the correlation may be used to obtain an attention map of feature maps to extract a final feature map. As an example, the correlation may be calculated through performing embedding for a Key, a Query, and a Value, and the feature map may be extracted by multiplying the Value by the attention map. In addition, the final feature map may be extracted based on a layer that has learned an interaction between feature maps through performing concatenation and convolution operations on the feature maps. Here, the layer having learned the interaction may include the global-region feature interaction layer shown in FIG. 4, and the learning process is the same as described above. The transformer encoding is described in more detail in FIG. 7.

Thereafter, features of the input image may be extracted through the final feature map extracted through the transformer encoding (S604). The final feature map may be extracted by merging the extracted feature maps based on the correlation, the interaction, and the like of the extracted feature maps. Here, the image feature extraction includes recognition of an object in an image, and the object recognition may include classification of a size, a feature, a type, a movement method, and the like of an object.

Meanwhile, since FIG. 6 corresponds to an embodiment of the present disclosure, the order of some operations may be changed, some operations may be performed simultaneously, some of the operations may be omitted, or other operations may be added.

Figure 7:
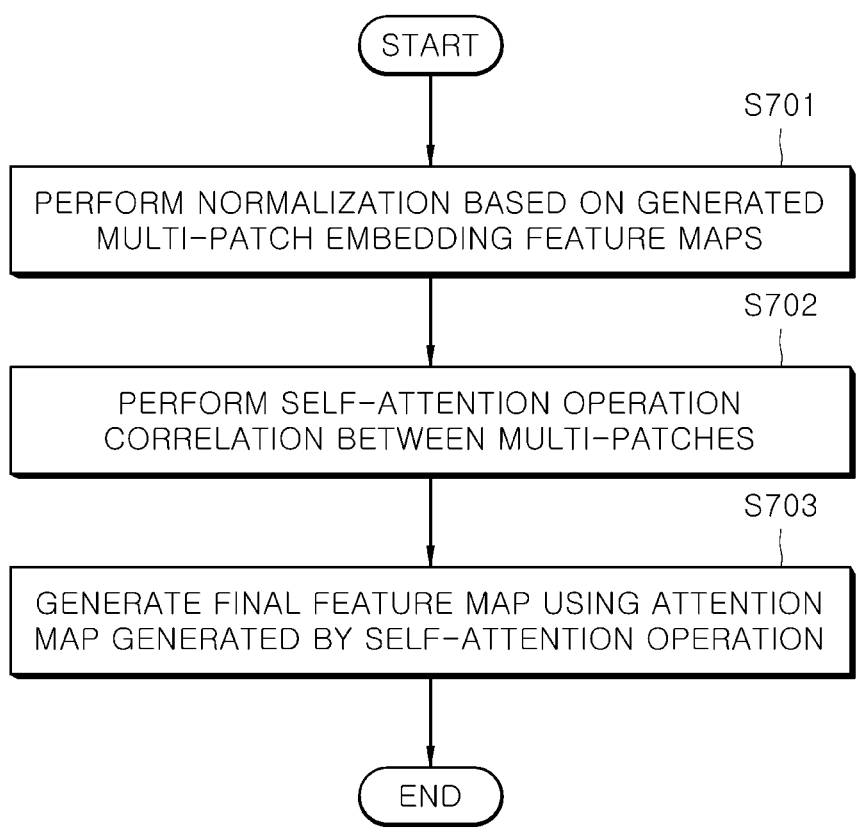
FIG. 7 is a flowchart showing a transformer encoding method used for extracting an image feature based on a vision transformer according to an embodiment of the present disclosure.

FIG. 7 is a flowchart showing a transformer encoding method for extracting an image feature based on a vision transformer according to an embodiment of the present disclosure.

As an example, the transformer encoding method shown in FIG. 7 may be performed by the apparatus and system for extracting an image feature based on a vision transformer described with reference to FIG. 8, and may correspond to the transformer encoder or the multi-path transformer encoder described above with reference to the other drawings.

As an example, for the vision transformer-based image feature extraction, an image may be received after performing embedding on multi-patches, and feature maps for the corresponding image may be generated. Normalization may be performed based on the generated multi-patch embedding feature maps (S701), on which the normalization may be performed by the normalization layers 501 and 503 shown in FIG. 5. Normalization may be performed to prevent large-scale features from having a growing influence.

Thereafter, a self-attention operation may be performed based on the correlation between the multi-patches (S702). As described above, the self-attention operation may be performed by the multi-head attention (502 in FIG. 5), and include a process of calculating the correlation between the input patches through performing embedding for a Key, a Query, and a Value. For example, patches including similar regions and/or categories are caused to have a high correlation value, and conversely, unrelated patches are caused to have a low value, thereby obtaining an attention map QK.

Thereafter, the attention map generated by the self-attention operation is used to generate a final feature map (S703). The process may include an operation of extracting a feature map, reflecting attention, by multiplying the Value value by the attention map obtained in advance. In addition, the extracted feature map, reflecting attention, may be passed through the normalization layer and the feed forward layer FFN again, to obtain the final feature map. As described above, the final feature map may be input to the global-region feature interaction layer for image feature extraction, e.g., recognition of an object in an image.

Meanwhile, since FIG. 7 corresponds to an embodiment of the present disclosure, the order of some operations may be changed, some operations may be performed simultaneously, some of the operations may be omitted, or other operations may be added.

Figure 8:
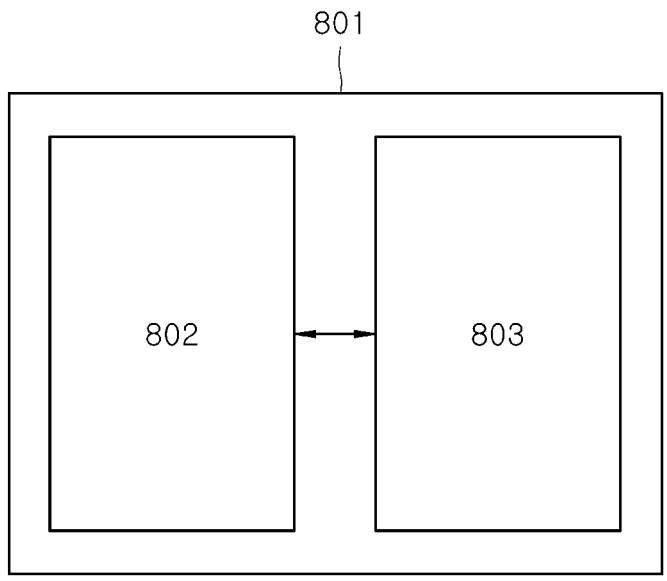
FIG. 8 is an apparatus and system for extracting an image feature based on a vision transformer according to an embodiment of the present disclosure.

FIG. 8 is an apparatus and system for extracting an image feature based on a vision transformer according to an embodiment of the present disclosure.

As an example, the apparatus and system for extracting an image feature based on a vision transformer according to the embodiment of the present disclosure shown in FIG. 8 may provide the technology and functions described with reference to FIGS. 1 to 5 and perform the method of extracting an image feature based on a vision transformer according to the embodiment of the present disclosure described with reference to FIG. 6.

As an example, an apparatus 801 for extracting an image feature based on a vision transformer according to the embodiment of the present disclosure may include a memory 802 for storing data and/or instructions and a processor 803. The processor 803 may control the memory 802, but may include one or more processors. The processor 702 may perform embedding on a plurality of patches of an input image, extract feature maps for the one or more embedding patches, perform neural network-based transformer encoding using the extracted feature maps, and extract features of the input image through a final feature map extracted through the transformer encoding. The image feature extraction may include a process of recognizing objects in the image. This is the same as described above with reference to the other drawings.

As another example, when FIG. 8 illustrates a system 801 for extracting an image feature based on a vision transformer according to an embodiment of the present disclosure, the system 801 may include one or more apparatuses 802 for extracting an image feature based on a vision transformer according to an embodiment of the present disclosure, and may additionally include a camera that collects an input image, an output layer show in FIG. 1, a global-region feature interaction layer 401 shown in FIG. 4, and the like.

Various embodiments of the present disclosure are not intended to list all possible combinations, but are intended to describe representative aspects of the present disclosure, and items described in various embodiments may be applied independently or in combinations of two or more thereof.

In addition, in describing various embodiments of the present disclosure, components and/or operations described using the same terminology may be considered the same. Furthermore, the descriptions of the embodiments with reference to the drawings may be mutually supplementary unless otherwise specified or contradicted in the embodiments.

Further, various embodiments of the present disclosure may be implemented by hardware, firmware, software, or a combination thereof. In addition, it may be implemented by a combination of one or more pieces of software rather than one piece of software, and one subject may not perform all processes.

For implementation by hardware, it may be implemented by one or more among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), a general processor, a controller, a microcontroller, a microprocessor, and the like. For example, it may take various forms including a genera processor, or disclosed in combinations of one or more pieces of hardware.

The scope of the present disclosure includes software or machine-executable instructions (e.g., an operating system (OS), an application, firmware, programs, etc.) that cause an operation according to various embodiment methods to be executed on a device or computer, and a non-transitory computer-readable medium on which such software or instructions or the like are stored and executable on a device or computer.

As an embodiment, a computer program stored in a non-transitory computer readable medium according to the present disclosure executes, by a computer, performing embedding on multi-patches of an input image; extracting feature maps for the embedding multi-patches; performing neural network-based transformer encoding using the extracted feature maps, and extracting features of the input image through a final feature map extracted through the transformer encoding, wherein the patches may be implemented to have different sizes from each other.

As is apparent from the above, according to an embodiment of the present disclosure, image feature extraction can be performed rapidly and efficiently based on AI.

According to an embodiment of the present disclosure, image feature extraction can be performed rapidly and efficiently based on a vision transformer.

According to an embodiment of the present disclosure, object recognition and segmentation in an image that requires various-sized feature information can be achieved by performing embedding on patches of different sizes.

According to an embodiment of the present disclosure, transformer encoding can be independently performed using feature maps for patches of different sizes.

The effects of the present disclosure are not limited to those described above, and other effects not described above will be clearly understood by those skilled in the art from the above detailed description. That is, unintended effects resulting from implementation of the configuration described in the present disclosure may also be derived by those skilled in the art from the embodiments of the present disclosure.

Although exemplary embodiments of the present invention have been described for illustrative purposes, those skilled in the art will appreciate that various modifications, additions and substitutions are possible without departing from the scope and spirit of the present invention. Accordingly, the scope of the present invention is not to be limited by the above embodiments but by the claims and the equivalents thereof

What is claimed is:

1. An apparatus for extracting an image feature based on a vision transformer, the apparatus comprising:
    a memory configured to store data; and
    a processor configured to control the memory,
    wherein the processor is configured to:
        divide an input image into a plurality of patches having different sizes;
        perform embedding on the plurality of patches to generate embedded patches;
        extract feature maps from the embedded patches;
        perform transformer encoding, using a vision transformer neural network, on the extracted feature maps to generate a final feature map; and
        extract a feature of the input image based on the final feature map,
    wherein the transformer encoding is performed by obtaining a correlation between the plurality of patches.

2. The apparatus of claim 1, wherein the embedding is performed on the plurality of patches in the different sizes in a parallel manner.

3. The apparatus of claim 1, wherein the transformer encoding is performed on the feature maps in a parallel manner.

4. The apparatus of claim 1, wherein the plurality of patches have areas overlapping each other.

5. The apparatus of claim 1, wherein the correlation is determined according to whether a similar region or a similar category is included between the plurality of patches.

6. The apparatus of claim 5, wherein the correlation is used to obtain an attention map of the feature maps to extract the final feature map.

7. The apparatus of claim 6, wherein the correlation is calculated based on embedding for a Key, a Query, and a Value used in a self-attention operation.

8. The apparatus of claim 7, wherein the feature map is extracted by multiplying the Value by the attention map.

9. The apparatus of claim 8, wherein the final feature map is extracted based on a neural network layer that has learned an interaction between the feature maps through performing concatenation and convolution operations on the feature maps.

10. A method of extracting an image feature based on a vision transformer, the method comprising:

dividing an input image into a plurality of patches having different sizes;

performing embedding on the plurality of patches to generate embedded patches;

extracting feature maps from the embedded patches;

performing transformer encoding, using a vision transformer neural network, on the extracted feature maps to generate a final feature map; and extracting a feature of the input image based on the final feature map, wherein the transformer encoding is performed by obtaining a correlation between the plurality of patches.

11. The method of claim 10, wherein the embedding is performed on the plurality of patches in the different sizes in a parallel manner.

12. The method of claim 10, wherein the transformer encoding is performed on the feature maps in a parallel manner.

13. The method of claim 10, wherein the plurality of patches have areas overlapping each other.

14. The method of claim 10, wherein the correlation is determined according to whether a similar region or a similar category is included between the plurality of patches.

15. The method of claim 14, wherein the correlation is used to obtain an attention map of the feature maps to extract the final feature map.

16. The method of claim 15, wherein the correlation is calculated based on embedding for a Key, a Query, and a Value used in a self-attention operation.

17. The method of claim 16, wherein the feature map is extracted by multiplying the Value by the attention map.

18. A transformer encoding method for extracting an image feature based on a vision transformer, the transformer encoding method comprising:

embedding a plurality of patches for an image;

extracting feature maps from the embedded patches;

normalizing the feature maps;

calculating a correlation between the plurality of patches by performing a self-attention operation based on the normalized feature maps; and generating a final feature map based on the correlation using an attention map generated by the self-attention operation, wherein the patches have different sizes, and the correlation is derived through performing embedding for a Key, a Query, and a Value used in the self-attention operation.

* * * * *